United States Patent [19]

Manoogian et al.

[11] 4,033,373

[45] July 5, 1977

[54] SINGLE HANDLE WATER FAUCET VALVE

[75] Inventors: Alex Manoogian, Grosse Pointe Farms, Mich.; Eric V. Pullen, Boca Raton, Fla.

[73] Assignee: Masco Corporation of Indiana, Greensburg, Ind.

[22] Filed: June 3, 1976

[21] Appl. No.: 692,451

[52] U.S. Cl. .................... 137/454.6; 137/625.17; 137/625.4

[51] Int. Cl.² .................. F16K 11/02; F16K 19/00

[58] Field of Search ....... 137/625.17, 625.4, 454.6, 137/625.41; 251/172

[56] References Cited

UNITED STATES PATENTS

| | | | |
|---|---|---|---|
| 2,747,604 | 5/1956 | Fraser | 137/625.4 X |
| 2,975,806 | 3/1961 | Moen | 137/625.17 |
| 2,987,079 | 6/1961 | Page | 137/625.17 |
| 3,012,582 | 12/1961 | Russell | 137/625.17 |
| 3,105,519 | 10/1963 | Fraser | 137/625.17 |
| 3,185,176 | 5/1965 | Webb | 137/625.17 |
| 3,645,493 | 2/1972 | Manoogian | 251/120 |
| 3,730,222 | 5/1973 | Moen | 137/625.17 |

*Primary Examiner*—William R. Cline
*Attorney, Agent, or Firm*—E. Dennis O'Connor

[57] ABSTRACT

A valve for a single handle water faucet which includes a housing having a central chamber open at one of its ends. Hot and cold water input passages are formed in the housing and are connectable to pressurized sources of hot and cold water, respectively. Each of the input passages communicates with the housing chamber through openings in a wall thereof. A water discharge passage is formed in the housing and leads from the housing chamber to exterior of the valve. A valve cartridge subassembly is provided that is capable of insertion and removal from the housing as a unit to facilitate assembly, maintenance and repair. This subassembly carries first valve means that control water input to the housing chamber and second valve means that control the flow of water through the discharge passage. Both valve means are connected for integral movement with a manual operating handle that extends through the valve casing to exterior of the valve. Also included in the cartridge subassembly are sealing means providing watertight seals between the casing and housing and between the casing and first valve means. These sealing means are arranged so that advantageous elastomeric sealing elements prone to wear are not in contact with movable valve parts.

13 Claims, 4 Drawing Figures

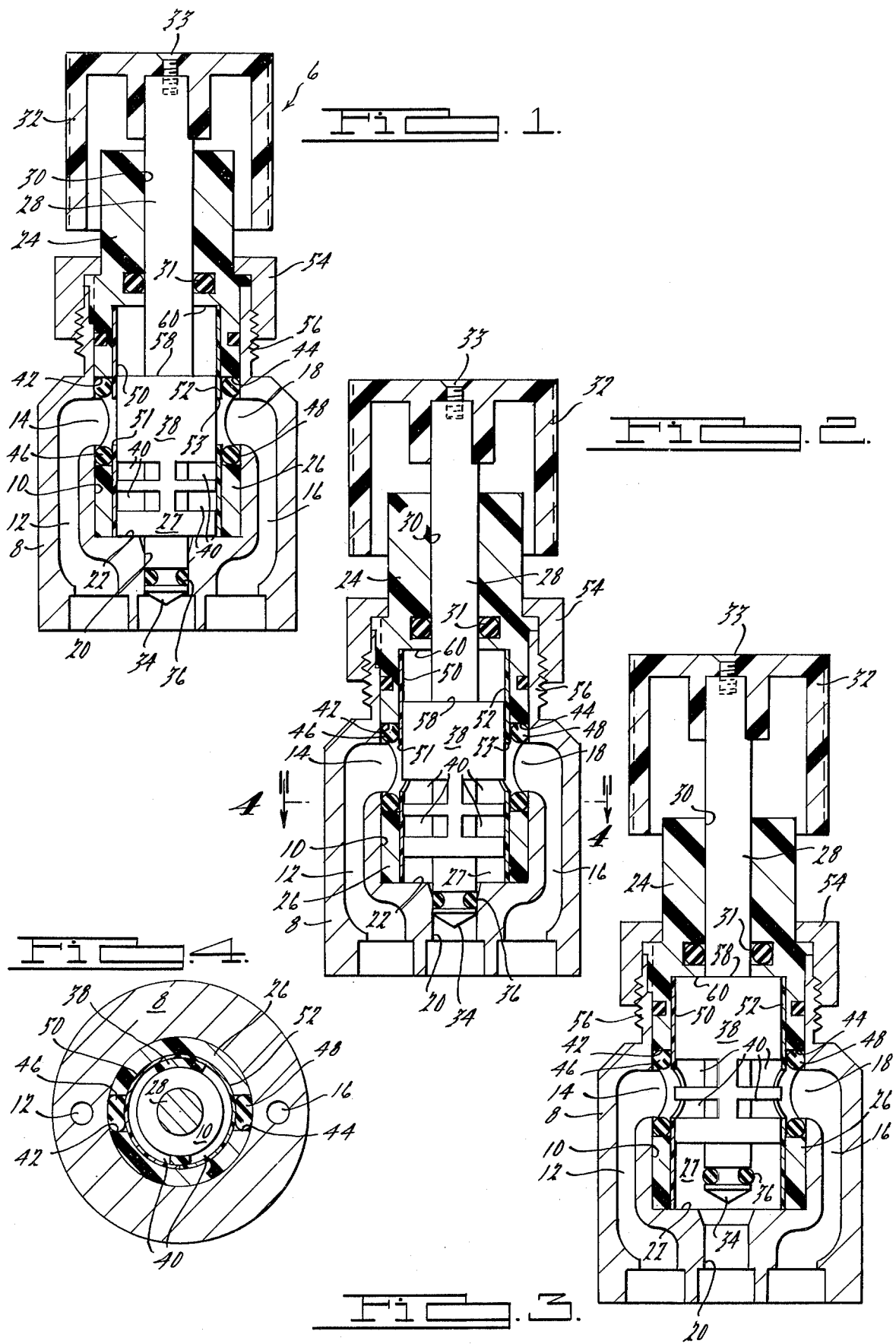

SINGLE HANDLE WATER FAUCET VALVE

BACKGROUND OF THE INVENTION

Water faucets having a single handle that controls both water volume and the proportions of hot and cold water passing the faucet have attained great commercial acceptance. The popularity of such faucets has been due in large part to the ease of operation a single operating handle provides, as well as great reliablity that has been a feature of the design of many of such faucets.

A great deal of development work that recently has transpired in the single handle water faucet art has been directed to schemes yielding the above benefits coupled with the additional advantage of quiet operation. Quitet operation has been found to be desired by many of the consuming public and has been dictated by various building codes throughout the world.

While the development of water faucets yielding quiet operation has proven to be somewhat empirical, certain parameters for faucet valve design are known to be necessary for this advantage. For example, it has ben found that a decrease in noise is obtained in a valve that cracks open over a wide area, as about periphery of an arcuate valve member, as opposed to the arrangement where cracking open occurs over a smaller or pinpoint area such as between two circular water passages brought into registry. Another factor contributing to quiet faucet operation is the provision of an intermediate chamber in the faucet valve between the water input and discharge locations that initially is pressurized when the valve is turned from the "off" position but prior to the opening of the water discharge port. (Such a construction is shown in a single handle valve in U.S. Pat. No. 3,645,493, issued Feb. 29, 1972, and assigned to the assignee of this invention.)

An additional design consideration in single handle faucets is the desirability, and necessity in many plumbing code jurisdictions, of a provision against cross bleed between the hot and cold water input lines when the valve is in the "off" condition.

Prior art faucet valves in single handle configuration are known which incorporate the various desirable features and parameters discussed above. However, such valves tend to be relatively complicated in design in order to provide these various features and such complication and the attendant large number of parts lead to expense of manufacture and assembly. This complexity also renders the valves difficult to maintain and repair should such action become necessary. In fact, valve disassembly in many instances is beyond the capability of one untrained in this art negating home repairs by the faucet owner.

It is, therefore, an object of the present invention to provide a valve for a single handle water faucet that is quiet in operation due to inclusion of features allowing cracking open of the valve over a relatively large area and initial pressurization of an intermediate valve chamber prior to water discharge, thereby isolating initial pressure line noise from valve discharge. Another object of the present invention is the provision of a single handle faucet valve that eliminates the possibility of cross bleeding between the hot and cold water inlet lines when the valve is in the "off" condition. A still further object of the present invention is to provide a valve having such features wherein the working valve parts are included in a subassembled valve cartridge that may be assembled and removed as a unit from the valve housing. A still further object of this invention is the provision of a valve having a relatively small number of working parts that easily may be manufactured and assembled and which will remain functional over a long faucet life despite the high incidence of utilization of which such valves often are subjected.

SUMMARY OF THE INVENTION

A single handle water faucet valve constructed in accordance with this invention includes a housing having a central chamber open at one of its end. Hot and cold water input passages are formed in the housing and are connectable to pressurized sources of hot and cold water, respectively. Each of the input passages communicates with the housing chamber through openings in the chamber wall. A water discharge passage is formed in the housing and communicates between the housing chamber and exterior of the valve. A valve casing partially is telescopically received in the housing chamber. A first valve member is positioned in the housing chamber and is movable selectively between positions allowing or blocking water flow from the input passage into the housing chamber. A second valve member in the housing chamber is movable selectively between positions allowing or blocking water flow from the housing chamber through the discharge passage. A manually operable handle is connected to both the first and second valve members and has unitary movement with the valve members. The handle is journaled by the casing and extends through the casing from the housing chamber to exterior of the valve. First sealing means are carried by the casing and provided a watertight seal betwen the housing and the casing about the periphery of the water openings. Second sealing means are carried by the casing and provide a watertight seal between the casing and the first valve means.

Because of the interrelationship between the casing, first valve member, second valve member, handle, first sealing means and second sealing means, these elements of the valve comprises a valve cartridge subassembly capable of insertion and removal from the housing as a unit.

DESCRIPTION OF THE DRAWING

FIG. 1 is a side elevation view, with parts insection and parts broken away, of the valve of this invention shown in the "off" position;

FIG. 2 is a view similar to FIG. 1 but showing the valve in an intermediate position between the "off" position and a position allowing water discharge;

FIG. 3 is a view similar to FIG. 1 but showing the valve in a position allowing water discharge; and FIG. 4 is a section view taken along the line 4-4 of FIG. 2.

DETAILED DESCRIPTION OF THE DRAWING

Referring now in detail to the drawing, the numeral 6 denotes generally a single handle water faucet valve constructed in accordance with this invention. Such a valve gives the capability, by manual manipulation of a single operating handle, to control both volume and proportion of hot and cold water discharged from the faucet with which it is associated.

A housing 8 of generally cylindrical configuration has formed therein a cylindrical central chamber 10 that is open at its upper end. Water input passages 12 and 16 are formed in the side wall of the housing 8 and open radially into chamber 10 through openings 14 and 18, respectively. Input passages 12 and 16 are capable of being connected to pressurized sources of hot and cold water as is well known in the plumbing art. A water discharge passage 20 leading from central chamber 10 to exterior of the valve extends through the end wall 22 of the central chamber.

A generally cylindrical valve casing 24 is partially telescopically received in central chamber 10 such that it bottoms against end wall 22. Valve casing 24 has a cylindrical main body 26 having formed therein a cylindrical bore 27 open at the end of main body 26 proximate discharge passage 20.

An elongate, rod-like operating handle 28 extends from exterior of the valve through a bore 30 in the uppermost portion of casing 24 into the bore 27 within central chamber 10. An O-ring 31 mounted in a groove in casing 24 provides a watertight seal between handle 28 and the side wall of bore 30. A handle knob 32 is removably scured to the end of handle 28 exterior of the valve by a fastener 33.

The end of rod 28 remote from knob 32 is in alignment with discharge passage 20, is tapered and comprises and discharge valve member 34 of the mixing valve 6. As will be explained in detail below, upon longitudinal movement of handle 28, discharge valve 34 is movable into and out of discharge passage 20 to block or allow water flow through the discharge passage. An O-ring 36 mounted in a groove in discharge valve 34 provides a watertight seal between the side wall of discharge passage 20 and the discharge valve.

An input valve 38 is connected to handle 28 within bore 27 and central chamber 10 for unitary movement with handle 28. It has been found convenient for valve member 38 to be integarally molded as a single piece with handle 28. Valve member 38 is in the form of a cylindrical skirt which surrounds a portion of handle 28 and which is closed at its upper extremity by end wall 58 and open at its lower extremity. The side wall of the input valve 38 has formed therethrough a plurality of spaced apart slots 40, the significance of which will be explained below.

The side wall of valve casing; main body 26 has formed therethrough a pair of input apertures 42 and 44. The orientation of casing 24 within chamber 10 is such that apertures 42 and 44 register with openings 14 and 18, respectively. A pair of O-rings 46 and 48 are mounted within apertures 42 and 44, respectively.

Position between the side wall of valve casing main body bore 27 and the side wall of input valve member 38 are a pair of arcuate inserts in the form of curved sheets. Insert 50 has formed therethrough a hole 51 and insert 52 has formed therethrough a hole 53. Inserts 50 and 52 are positioned such that hole 51 registers with a portion of aperture 42 and opening 14, and hole 53 registers with a portion of aperture 44 and opening 18. The relative sizes of the parts are such that when the valve is assembled as shown in the drawings, O-rings 46 and 48 are somewhat compressed and exert resilient forces directed radially inwardly against inserts 50 and 52, respectively. Inserts 50 and 52, because of their relatively thin construction, are somewhat flexible and the resilient forces from O-rings 46 and 48 are sufficient to urge the inserts into intimate contact with the outer wall of input valve 38. A material which has been found desirable for inserts 50 and 52 is a plastic material marketed by the E. I. duPont de Nemours and Company under the trade name "Tefzel." Copper is also acceptable.

The parts of valve 6 are held in the position shown in the drawing by an internally threaded nut 54 that engages external threads formed on upwardly extending collar 56 of housing 8.

The operation of valve 6 is as follows. In FIG. 1, operating handle 28 is in a full downward position with the lower end of input valve member 38 bottoming against end wall 22 of central chamber 10. This is the "off" position of valve 6 in that pressurized water in input passages 12 and 16 cannot enter the central chamber 10 because the side wall of input valve member 38 blocks input openings 14 and 18, apertures 42 and 44 and holes 51 and 53. O-rings 46 and 48 provided watertight seals between housing 8 and valve casing main body 26. Inserts 50 and 52 provide watertight seals between the inner wall of valve casing bore 27 and input valve 38. In the event of a failure of the sealing function provided by inserts 50 and 52, water escaping upwardly between the valve member 38 and the inserts will be contained by O-ring 31, while water escaping downwardly between the inserts and the valve member will be prevented from exiting the valve by O-ring 36 of discharge valve 34. The discharge valve 34, with the operating handle 28 in the position shown in FIG. 1, is located within the discharge passge 20. It is obvious that with the valve parts in the position of FIG. 1, cross bleeding between water input lines 12 and 16 cannot occur.

FIG. 2 illustrates an intermediate valve position wherein handle 28 has been moved upward manually a slight distance from the position shown in FIG. 1. In the position of FIG. 2, uppermost slots 40 in input valve 38 have been brought into partial registry with openings 14 and 18 such that water flows from the input passages 12 and 16 through slots 40 and into the bore 27 within the central chamber 10. It should be noted that since slots 40 do not extend about the entire periphery of input valve member 38 (FIG. 4) and operting handle 28 and input valve 38 are rotatable about the longitudinal axis of handle 28, it is possible for handle 28 to be manually rotated about its axis so that in the longitudinal position of FIG. 2 water flows into the central chamber from only one or both of the input passages 12 or 16, depending on the rotational position of the handle.

In the position of FIG. 2, central chamber 10 becomes filled with pressurized water because discharge valve 34 remains within discharge passage 20, thereby preventing water discharge from the faucet. This arrangement provides for the isolation of noise caused by water flow during the cracking open of the input valve 38 from exterior of the valve.

FIG. 3 illustrates the valve parts in an "on" condition wherein water is being discharged from the valve through passage 20. In the position of FIG. 3, operating handle 28 has been moved upwardly an additional distance from the position of FIG. 2 such that slots 40 are in greater area registry with the input openings 14 and 18, thus allowing greater water flow volume from input passsages 12 and 16. In the FIG. 3 longitudinal position of handle 28, discharge valve 34 is removed from discharge passage 220 allowing discharge flow. It readily may be appreciated that the cracking open of dishcarge passage 20 occurs about a relatively large area about the periphery of discharge valve 34, thus keeeping cracking open water flow noise at a relatively low level.

Rotation of operating handle 28 when such handle is in the longitudinal position of FIG. 3 provides relatively greater and lesser areas of registry between slots 40 and openings 14 and 18, thus providing for temperature adjustment in the water discharged through passage 20. The configuration of spaced apart slots 40 allows for relatively large slot areas to be brought into registry with openings 14 and 18, thereby providing large water flow volume, but still provides for support of O-rings 46 and 48 against radially inwardly directed movement due to water pressure. This support is provided by the outer wall of valve 38 positioned between the plural slots 40 (FIG. 3).

It is important to note that despite the fact that valve 6 provides provision against cross bleed in the "off" position, pressurization of an intermediate chamber before water discharge, discharge valve cracking open over a relatively large area of quiet initial discharge and positive sealing of the valve against leakage, the number of valve parts is relatively few. Additionally, all of the working parts of the valve are contained in a subassembly cartridge that may be inserted and removed as a unit in and from the housing 8. This cartridge comprises the valve casing 24, handle 28 together with input and output valves 38 and 34, O-ring 31, 36, 46 and 48 and inserts 50 and 52. Removal of this cartridge easily may be accomplished for maintenance or repair of the working parts by disengagement of nut 54 from collar 56 and the application of an upward force on handle 28. As handle 28 moves upward, top surface 58 of valve member 38 will abut end wall of bore 27 causing the entire valve casing and parts carried thereby to be removed from the housing 8 as a unitary cartridge.

Asembly of this cartridge at the time of manufacture is simple and leads itself to automated procedures. With the O-ring of the cartridge initially in place, inserts 50 and 52 are positioned within bore 27 and handle 28 (with knob 32 removed therefrom) carrying input valve 38, discharge valve 34 O-ring 36 is inserted through bores 27 and 30 of casing 24. Attachment of knob 32 prevents removal of handle 28.

It thus may be seen that the mixing valve of the present invention is adapted for inclusion in a single handle water faucet and is quiet in operation due to design features allowing cracking open of the valve discharge over a relatively large area following initial pressurization of an intermediate valve chamber. The valve 6 further provides for the elimination of cross bleeding between the inlet lines and with the valve in the "off" condition and positive sealing of the valve against leakage. These advantages are provided despite the fact that the valve has a relatively small number of working parts that easily may be manufactured and assembled. Further, all of the working parts may be inserted and removed from the valve housing as a cartridge in the form of a unitary subassembly.

We claim:

1. A single handle water faucet valve including a housing having a central chamber open at one of its ends, hot and cold water input passages formed therein being connectable to pressurized sources of hot and cold water, respectively, and each communicating with said housing chamber through openings in a wall thereof and a water discharge passage formed therein communicating between said housing chamber and exterior of said housing, the improvement comprising: a valve casing at least partially telscopically received in said housing chamber, a first valve member in said housing chamber and contiguous said chamber movable selectively between positions allowing or blocking water flow from said input passages into said housing chamber, a second valve member in said housing chamber movable selectively between positions allowing or blocking water flow from said housing through said discharge passage, a manually operable handle connected to both said first and second valve members for unitary movement therewith, said handle carried by and extending through said casing from said chamber to exterior of said faucet, first sealing means carried by said casing and forming a watertight seal between said housing and said casing about said water input openings, and second sealing means carried by said casing and forming a watertight seal between said casing and said first valve member, said casing first valve member, second valve member, handle, first sealing means and second sealing all comprising a valve cartridge subassembly capable of insertion and removal from said housing as a unit.

2. The valve of claim 1, wherein said housing chamber and said valve casing are generally cylindrical and wherein said openings are formed in the side walls of said housing chamber and said discharge passage is formed in the end wall of the closed end of said housing chamber.

3. The valve of claim 2, wherein said valve casing has formed therein a generally cylindrical casing chamber wit water input apertures formed in the side wall thereof and in registry with said openings, said valve casing chamber having an open end in registry with said discharge passage.

4. The valve of claim 3, wherein said first sealing means comprises a pair of resilient elements each positioned in one of said apertures and abutting the side wall of said housing chamber about the periphery of said openings, and said second sealing means comprises members positioned between said resilient elements and said first valve member and urged into contact with the latter by the resilient force of the former.

5. The valve of claim 3, wherein said handle is an elongate member extending through a bore in the closed end of said valve casing, said second valve member formed on the other of its ends.

6. The valve of claim 5, wherein said handle and first and second valve members are movable among a first position wherein said first and second valve members block water flow from said input passages and through said discharge passges repectively, a second position wherein said first valve member allows water flow from at least one of said input passages into said housing chamber and said second valve member blocks flow from said housing chamber into said discharge passage, and a third position wherein said first valve member allows water flow from at least one of said input passages into said housing chamber and said second valve member allows water flow from said housing chamber into said discharge passage.

7. A single handle water faucet valve including a housing having a generally cylindrical central chamber open at one of its ends, hot and cold water input passages formed therein being connectable to pressurized sources of hot and cold water respectively and each communicating with said housing chamber through openings in the side wall thereof and a water discharge passage formed in the end wall at the other of the housng chamber ends communicating between said housing chamber and exterior of said housing, the improvement comprising: a generally cylindrical valve casing at least partially telescopically received in said housing chamber and having a generally cylindrical open ended bore formed in a portion thereof, said open end of said bore being in registry with said discharge passage, said valve casing having formed through the side wall thereof a pair of apertures each in registry with one of said openings, an elongate manually operable valve handle extending through a bearing passage in said casing with one of its extending to exterior of said valve and capable of longitudinal movement along its axis and rotational movement about its axis, discharge valve means on the other end of said handle and operable to close said discharge passage when said handle is in a first longitudinal position, input valve means positioned within said bore comprising a hollow generally cylindrical skirt open at one of its ends and connected to and surrounding said handle intermediate the ends of said handle for unitary movement therewith, said skirt blocking input water flow from said input passages through said openings and casing apertures when said handle is in said first longitudinal position, said skirt having valve apertures therethrough, at least one of said valve apertures in registry with at least one of said casing apertures when said handle is in a second longitudinal position permitting water flow from said input passages through said openings, at least one of said casing apertures said valve apertures into said central chamber.

8. The valve of claim 7, wherein in said second longitudinal position said discharge valve means prevents water flow from said central chamber through said discharge passage.

9. The valve of claim 8, wherein the open end of said skirt is proximate said discharge passages and said handle is movable to a third longitudinal position wherein at least one of said valve apertures register with at least one of said casing apertures to permit water flow from said input passages through at least one of said openings and said casing apertures into said central chamber and said discharge valve means permits water flow from said central chamber through said discharge passage.

10. The valve of claim 9 wherein said handle is movable among a plurality of rotational positions when said handle is in the second and third longitudinal positions to vary the area of registry between said casing apertures and said valve apertures to vary the proportion of hot and cold water flowing into said second chamber.

11. the valve of claim 7, further including first seal means carreid and positioned in said casing apertures and providing a watertight seal between said housing and said casing about the periphery of said openings.

12. The valve of claim 11, further including second seal means carried by said casing and positioned partially between said first seal means and said skirt, said second seal providing a watertight seal between said casing and said input valve about the periphery of said casing apertures. .

13. The valve of claim 13, wherein said first seal means are elastomeric members exerting a resilient force on said second seal means urging the latter against said skirt.

* * * * *